United States Patent [19]

Scalzo

[11] Patent Number: 5,161,367
[45] Date of Patent: Nov. 10, 1992

[54] COAL FIRED GAS TURBINE SYSTEM WITH INTEGRAL TOPPING COMBUSTOR

[75] Inventor: Augustine J. Scalzo, Longwood, Fla.

[73] Assignee: Westinghouse Electric Corp., Pittsburgh, Pa.

[21] Appl. No.: 686,958

[22] Filed: Apr. 18, 1991

[51] Int. Cl.[5] .............................................. F02C 3/26
[52] U.S. Cl. ................................ 60/39.12; 60/39.37; 60/39.463
[58] Field of Search ............... 60/39.12, 39.182, 39.37, 60/39.463, 39.464

[56] References Cited

U.S. PATENT DOCUMENTS

| | | | |
|---|---|---|---|
| 2,676,460 | 4/1954 | Brown | 60/39.37 |
| 3,446,012 | 5/1969 | Foster-Pegg | 60/39.12 |
| 3,446,014 | 5/1969 | Foster-Pegg | 60/39.182 |
| 4,387,559 | 6/1983 | Leto | 60/39.463 |

OTHER PUBLICATIONS

"A High Performance PFB System for Utility Application", American Society of Mechanical Engineering Paper No. 87GT36, P. Berman and J. Hynds (Jun. 1987).

"The Production Of Coal-Derived Fuel Gas For Powering Gas-Turbines Using Fluidised Bed Techniques", M. J. Cooke and B. Robson, 13 Congres International Des Machines A Combustion (CIMAC) (1979).

Primary Examiner—Louis J. Casaregola

[57] ABSTRACT

A coal fired gas turbine system with an integral topping combustor is provided for generating rotating shaft power by consuming coal. A carbonizer converts coal to a char and a gas fuel. The char is burned in a pressurized fluidized bed combustor (PFBC) supplied with compressed air from a gas turbine. The hot gas from the PFBC is directed to a topping combustor for further heating by burning the gas fuel produced by the carbonizer. The topping combustor is comprised of a plurality of cylindrical combustor cans disposed within a cavity formed by the gas turbine casing between the compressor and turbine sections. A perforated baffle disposed in the cavity creates a plenum so that the hot gas entering the casing through four pipes arranged about its periphery is uniformly distributed among the combustor cans.

20 Claims, 5 Drawing Sheets

COAL FIRED GAS TURBINE SYSTEM WITH INTEGRAL TOPPING COMBUSTOR

BACKGROUND OF THE INVENTION

This invention relates generally to a gas turbine based system for generating rotating shaft power utilizing a solid fuel, such as coal, in a pressurized fluidized bed combustor.

The high efficiency, low capital cost and short lead time of gas turbine based systems make them particularly attractive to electric utilities as a means for producing electrical power. However, traditionally, gas turbine operation has been limited to expensive, sometimes scarce, fuels—chiefly distillate oil and natural gas. As a result of the ready availability and low cost of coal, considerable effort has been expended toward developing a gas turbine system for generating electrical power which can utilize coal as its primary fuel. One area in which these efforts have focused concerns systems in which the combustion of coal is carried out in a pressurized fluidized bed combustor, hereinafter PFBC.

In one of the simplest gas turbine/PFBC power plant arrangements, ambient air, compressed in the compressor section of the gas turbine, serves to fluidize the bed and provides combustion air for the PFBC. After combustion in the PFBC, the air, now at a high temperature and vitiated by the products of combustion and entrained particulate matter, is exhausted from the PFBC. The air then flows through a cyclone separator wherein much of the particulate matter is removed. The air is then directed to the turbine section of the gas turbine where it is expanded, thereby producing useful shaft power. After expansion, the vitiated air exhausted from the turbine is vented to atmosphere.

The thermodynamic efficiency of such a system is poor, however, due to the need to limit the bed temperature, and hence the temperature of the air entering the turbine section, to approximately 870° C. (1600° F.) in order to optimize capture of the sulfur in the coal and avoid carryover of harmful alkali vapors into the turbine. This is in contrast to modern conventional gas or liquid fuel fired gas turbines, which can operate with turbine inlet gas temperatures as high as 1425° C. (2600° F.). As is well known in the art, increasing the temperature of the gas entering the turbine section increases the power output and efficiency of the gas turbine. Hence to achieve maximum efficiency, it has been proposed, in "A High Performance PFB System for Utility Application", American Society of Mechanical Engineering Paper No. 87GT36 by P. Berman and J. Hynds presented at the International Gas Turbine show at Anaheim, CA in June 1987, to employ a separate topping combustor—that is, a combustor external to the gas turbine and the PFBC—to raise the temperature of the air leaving the PFBC to the temperature required for maximum efficiency in the turbine. Although the topping combustor may be fired on oil or natural gas, to maximize coal utilization, the addition of a pyrolysis treatment operation (carbonizer) to the system has been proposed. The carbonizer converts coal to a low BTU gas and a solid, carbonaceous char. The low BTU gas is burned in the topping combustor and the char is burned in the PFBC.

Although the system proposed above offers the possibility of efficient use of coal in a gas turbine based system, practical considerations make it extremely difficult to utilize the separate topping combustor visualized by the prior art. The primary area of difficulty arises due to the need to transport the very high temperature gas from the topping combustor to the turbine section of the gas turbine. Ductwork capable of carrying such hot gas would be subject to high temperature and thermal stress, especially if, as is optimal from the thermodynamic standpoint, the gas is heated in the topping combustor to a temperature suitable for use in a modern high efficiency gas turbine (i.e., approximately 1425° C. (2600° F.)). In addition to the difficulty in maintaining mechanical integrity of the duct itself, the joint between the duct and the casing enclosing the gas turbine would be subjected to extreme thermal stresses and, therefore, liable to cracking from thermal fatigue.

Accordingly, it would be desirable to develop a solid fuel gas turbine system capable of operating at the high turbine inlet temperatures for which modern gas turbines are designed, without the need to duct the hot gas from an external topping combustor to the gas turbine casing.

SUMMARY OF THE INVENTION

It is an object of the current invention to provide a system for burning a solid fuel in a gas turbine based power plant.

It is a further object of the current invention to provide a gas turbine having an integral topping combustor for further heating of a hot gas produced by burning a solid fuel in a PFBC.

These and other objects are accomplished in a system for generating rotating shaft power having a gas turbine and a PFBC. The gas turbine has a compressor section and turbine section, both enclosed by a casing. The casing forms first and second cavities between the compressor and turbine sections which are in flow communication with the PFBC. A plurality of combustors are disposed in the first cavity for further heating the hot gas produced by the PFBC. A first perforated baffle in the first cavity forms a plenum therein for distributing hot gas from the PFBC to the combustors. The compressor discharge is in flow communication with the second cavity so that the compressor provides compressed air for fluidizing a solid fuel in the PFBC. A second perforated baffle disposed in the second cavity serves to distribute the compressed air from the compressor around a plenum formed in the second cavity.

DESCRIPTION OF THE PREFERRED EMBODIMENTS

Figure 1:
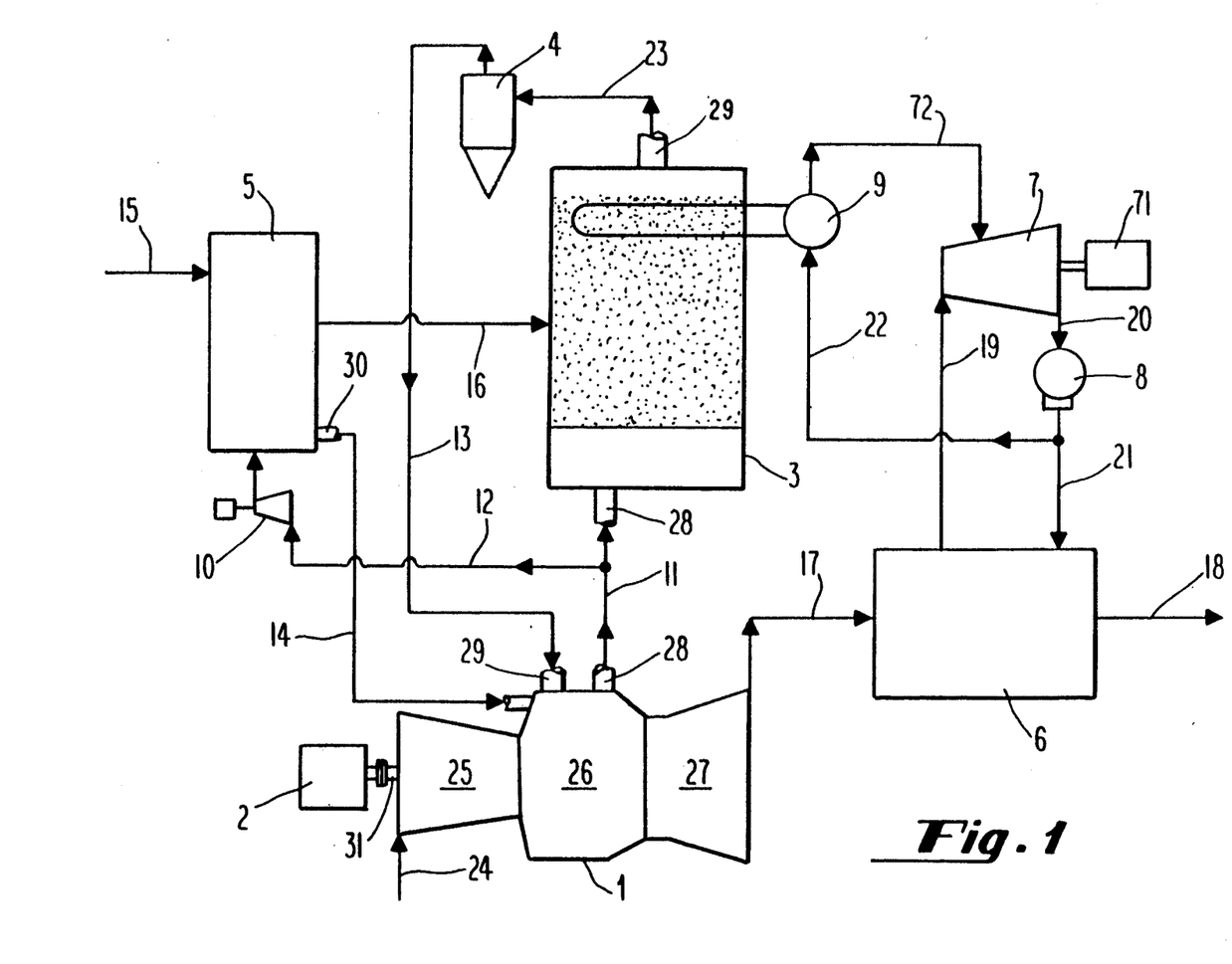
FIG. 1 is a schematic diagram of a coal fired gas turbine system with an integral topping combustor according to the current invention.
Figure 2:
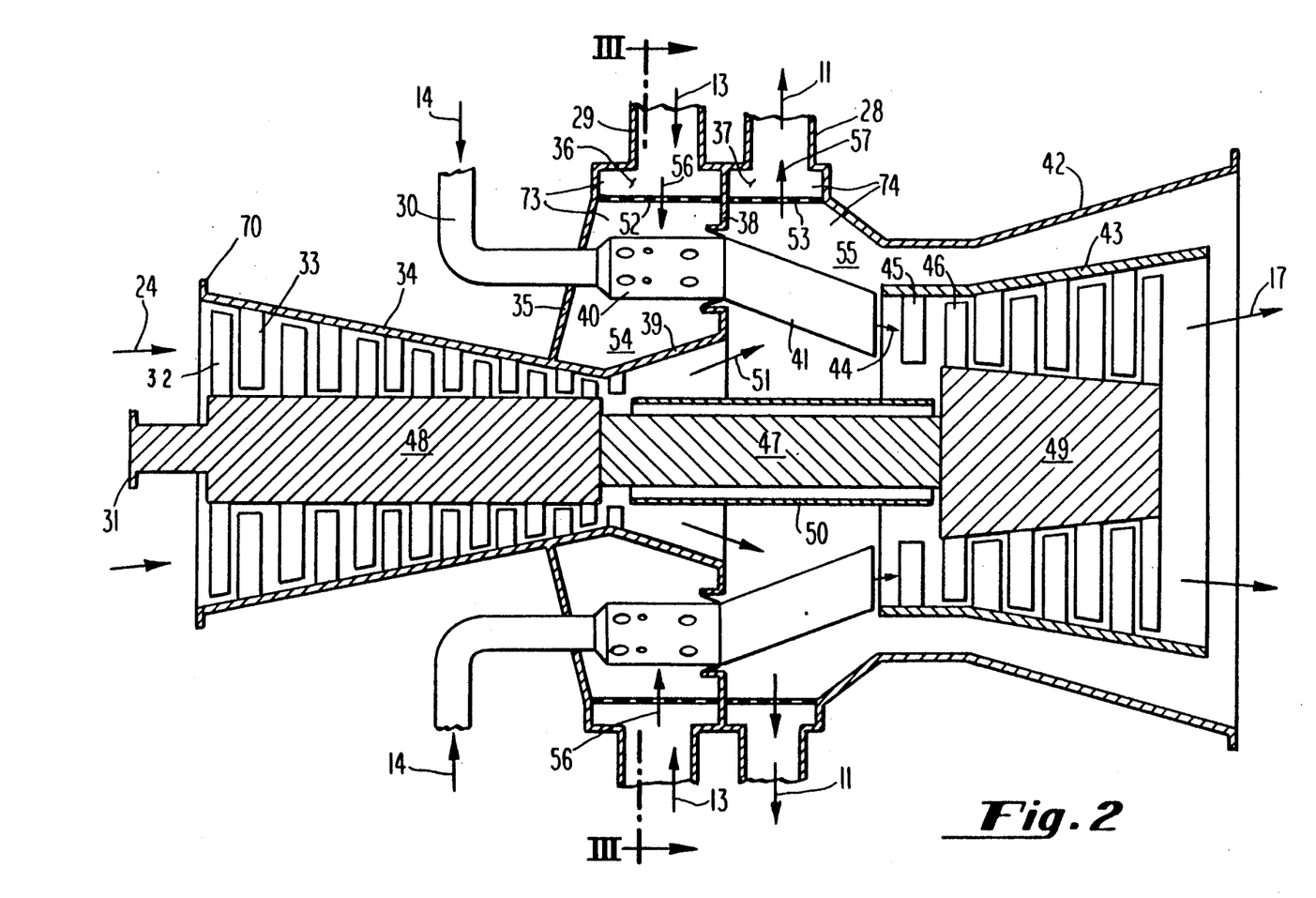
FIG. 2 is a longitudinal cross-section through the gas turbine shown in FIG. 1.

Referring to the drawings, wherein like numerals represent like elements, there is illustrated in FIG. 1 a solid fuel gas turbine system and in FIG. 2 a cross-section through the gas turbine 1 shown in FIG. 1. An oxygen-bearing gas 24, such as ambient air, enters the compressor section 25 of a gas turbine 1 and is compressed. A major portion of the compressed air 11 produced by the compressor 25 is directed to a PFBC 3. The PFBC consumes a solid fuel 16, which may be a char produced by a carbonizer 5 as discussed further below. The PFBC comprises a combustion chamber in which the solid fuel is maintained in a pressurized fluidized bed to promote combustion. The compressed air 11 fluidizes the bed and supplies the oxygen necessary for combustion of the solid fuel. As a result of the combustion of the fluidized solid fuel in the compressed air, the PFBC produces a hot compressed gas 23. The amount of solid fuel burned in the PFBC depends on the desired temperature of the gas 23.

As previously discussed, in order to optimize capture of the sulfur in the solid fuel and avoid carryover of harmful alkali vapors into the turbine, the temperature of the gas 23 produced by the PFBC is limited to approximately 870° C. (1600° F.). Unfortunately, the power produced by a gas turbine is proportional to the temperature drop across its turbine section, so that the higher the temperature of the gas entering the turbine the greater the power produced. Therefore, according to an important aspect of the current invention, the hot gas 23 produced by the PFBC, now vitiated by the combustion products, is directed to the combustion section 26 of the gas turbine 1. As shown in FIG. 1, prior to entering the combustion section 26, the hot gas 23 from the PFBC 3 flows through a cyclone separator 4, wherein much of the particulate matter entrained in the air is removed, thus minimizing erosion and fouling in the turbine section 27.

Low BTU gaseous fuel 14 produced by the carbonizer 5, as discussed further below, is burned in the hot gas 13 from the cyclone separator 4 in the combustion section 26, thereby further increasing the temperature of the hot gas produced by the PFBC. In order to optimize the sulfur capture and avoid the carryover of alkali vapors into the turbine section 27, the pyrolysis process in the carbonizer 5 is controlled so that the fuel gas 40 directed to the combustion section is at a temperature of approximately 870° C. (1600° F.) or less. In the preferred embodiment, sufficient gas fuel 14 is burned to heat the gas 44 discharging from the combustion section 26 to approximately 1425° C. (2600° F.). The high temperature gas 44 from the combustion section 26 flows through the turbine section 27, wherein the hot vitiated gas expands, thereby producing power in the rotating shaft 31 of the gas turbine. Although a portion of the power produced by the turbine is used to drive the compressor shaft 48, a significant excess of rotating shaft power is produced and may be used to generate electrical power by driving the shaft of a dynamoelectric machine 2.

An inherent aspect of the gas turbine cycle is that the temperature of the gas after expansion in the turbine, although reduced as a result of the expansion, is still relatively high. Thus, if the gas from the turbine is merely vented to atmosphere, no power will be produced by the portion of the thermal energy released by the fuel in order to raise the temperature of the gas entering the combustor to its temperature after expansion in the turbine, causing a reduction in the efficiency of the system.

In the solid fuel gas turbine system shown in Figure 1, this problem is solved by directing the expanded and partially cooled gas 17 exhausting from the turbine section 27 to a heat recovery steam generator 6, hereinafter HRSG, where the gas is further cooled by the transfer of heat to feedwater 21 from a condenser 8. The steam 19 generated by the HRSG 6 is expanded in a steam turbine 7 which drives a second dynamoelectric machine 71, thereby producing additional electrical power. The cooled vitiated gas 18 exhausting from the HRSG 6 is then discharged to atmosphere.

According to the current invention, a carbonizer 5 is incorporated into the system. As shown in Figure 1, the carbonizer 5 is supplied with coal 15 which it converts to a carbonaceous char 16 and a hydrocarbon-based gas 14, typically a low BTU gas, using a pyrolysis process. As previously explained, the carbonaceous char 16 is burned in the PFBC 3 and the hydrocarbon-based gas 14 is burned in the combustion section 26 of the gas turbine 1, allowing maximum utilization of the coal 15. In addition to coal 15, the carbonizer 5 requires a supply of high pressure oxygen. Such oxygen is obtained by bleeding a portion 12 of the air 11 discharged from the compressor section 25 to a boost compressor 10 and thence to the carbonizer 5.

As shown in FIG. 1, the heat transfer surfaces of a stream generator 9 are disposed inside the PFBC to control the temperature of the PFBC 3. The steam generator 9 is supplied with feedwater 22. The steam 72 generated in this manner may be advantageously inducted into the steam turbine 7. The steam 72 is expanded in the steam turbine 7 and is thereafter condensed in a condenser 8 for return to the cycle.

As shown in FIG. 1, the gas turbine is comprised of three sections, a compressor section 25, a combustion section 26 and a turbine section 27. As shown in FIG. 2, an approximately cylindrical casing 70 encloses the three sections. The compressor section 25 is comprised of a shaft 48, which forms a portion of a centrally disposed rotor 31, about the periphery of which are affixed a plurality of rotating blades 32 arrayed in circumferentially extending rows. A plurality of stationary vanes 33, arranged in circumferentially extending rows between each row of rotating blades 32, are affixed to the inner surface of the compressor portion 34 of the casing 70. The compressor inducts ambient air 24 at its inlet end and discharges compressed air 51 through a conical shaped diffuser 39 at its outlet end.

The compressed air 51 discharged from the compressor section 25 flows into an annular cavity 74 formed by the combustion system portion 35 of the casing 70. Cavity 74 surrounds a portion 47 of the rotor 31—referred to as the torque tube—which connects the compressor shaft 48 to the turbine shaft 49, thereby enabling the compressor 25 to be driven by the power produced in the turbine 27. A cylindrical housing 50—referred to as an air separator—separates the connecting shaft 47 from the cavity 74. A cylindrical perforated baffle 53 is concentrically disposed in the cavity 74 so as to divide the cavity into inner and outer annular plenums 55 and 37, respectively, with the outer plenum 37 surrounding the inner plenum 55. The baffle 53 creates a pressure drop in the compressed air flowing through the cavity 74 and, as shown in FIG. 4, holes 66 in the baffle divide the compressed air 51 into a plurality of streams 57, thereby serving to uniformly distribute the flow of compressed air 51 circumferentially around the plenum 37.

Four pipes 28, two of which are shown in FIG. 2, are connected to, and uniformly spaced around, the periphery of the cavity 74 so that plenum 37 is placed in air flow communication with the PFBC 3, thereby enabling the compressor 25 to provide the air 11 for the fluidization and combustion of the char 16 in the PFBC. Since air 11 is drawn from the cavity 74 at only four places, the air flow distributing effect of the baffle 53 and plenum 37 serves to prevent aerodynamic instabilities in the compressor 25 due to circumferential non-uniformities in the flow field at the diffuser 39.

Figure 3:
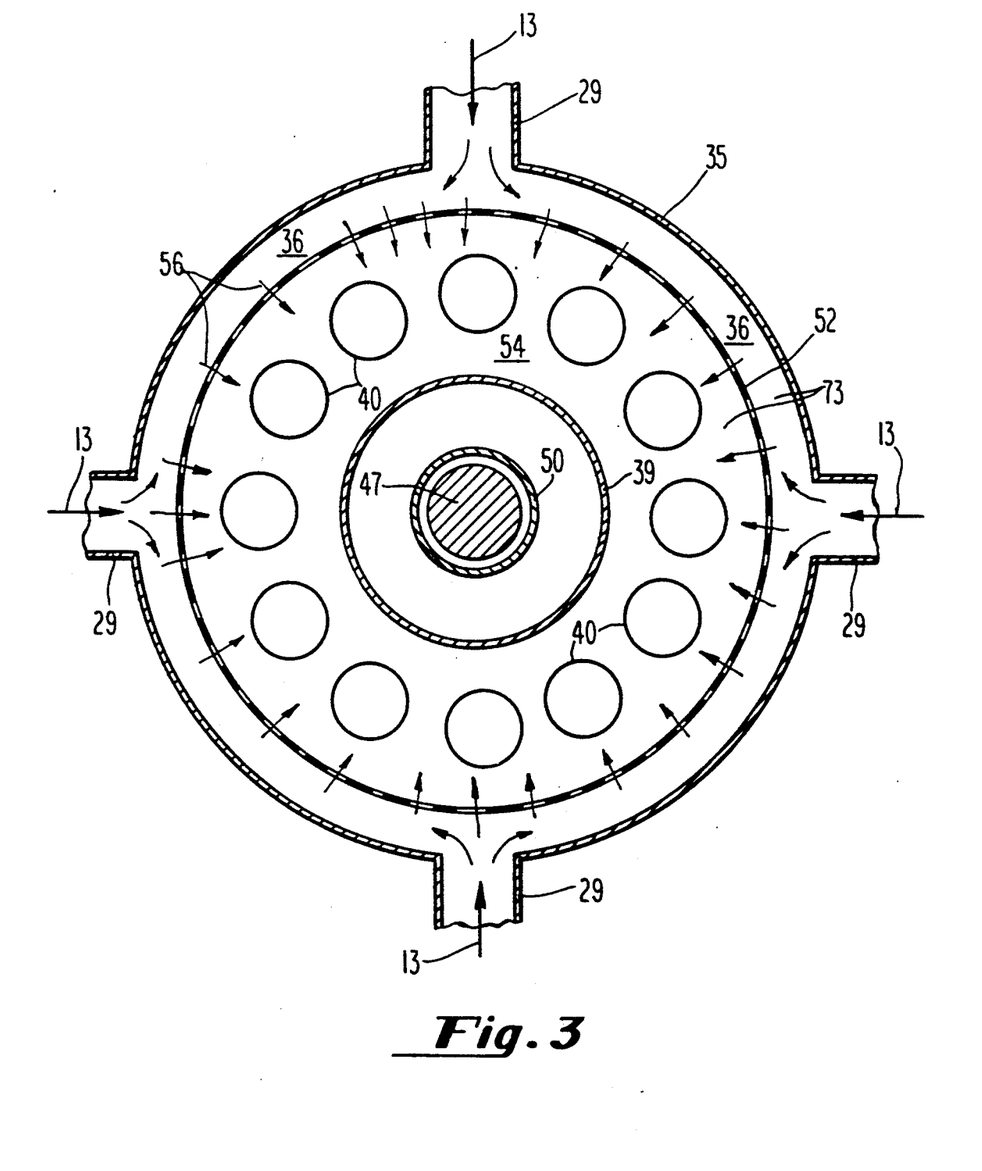
FIG. 3 is a cross-section taken through line III—III shown in FIG. 2.

After combustion in the PFBC 3, followed by clean up in the cyclone separator 4, the compressed air 11, now a hot gas 13, is returned to the gas turbine 1. Note that the hot gas 13 is essentially air vitiated by the products of combustion of the char 16 in the PFBC. As previously discussed, in the preferred embodiment the hot gas 13 from the PFBC 3 is at a temperature of 870° C. (1600° F.) or less. As shown in FIGS. 2 and 3, the hot gas 13 is returned via four pipes 29 connected to, and uniformly spaced around, the periphery of the combustion section portion 35 of the casing 70. Casing portion 35 forms an annular cavity 73 which surrounds the compressor diffuser 39 and the connecting shaft 47. A circumferential wall 38 extending between the combustion system casing 35 and the diffuser 39 separates cavity 73 from cavity 74.

Figure 4:
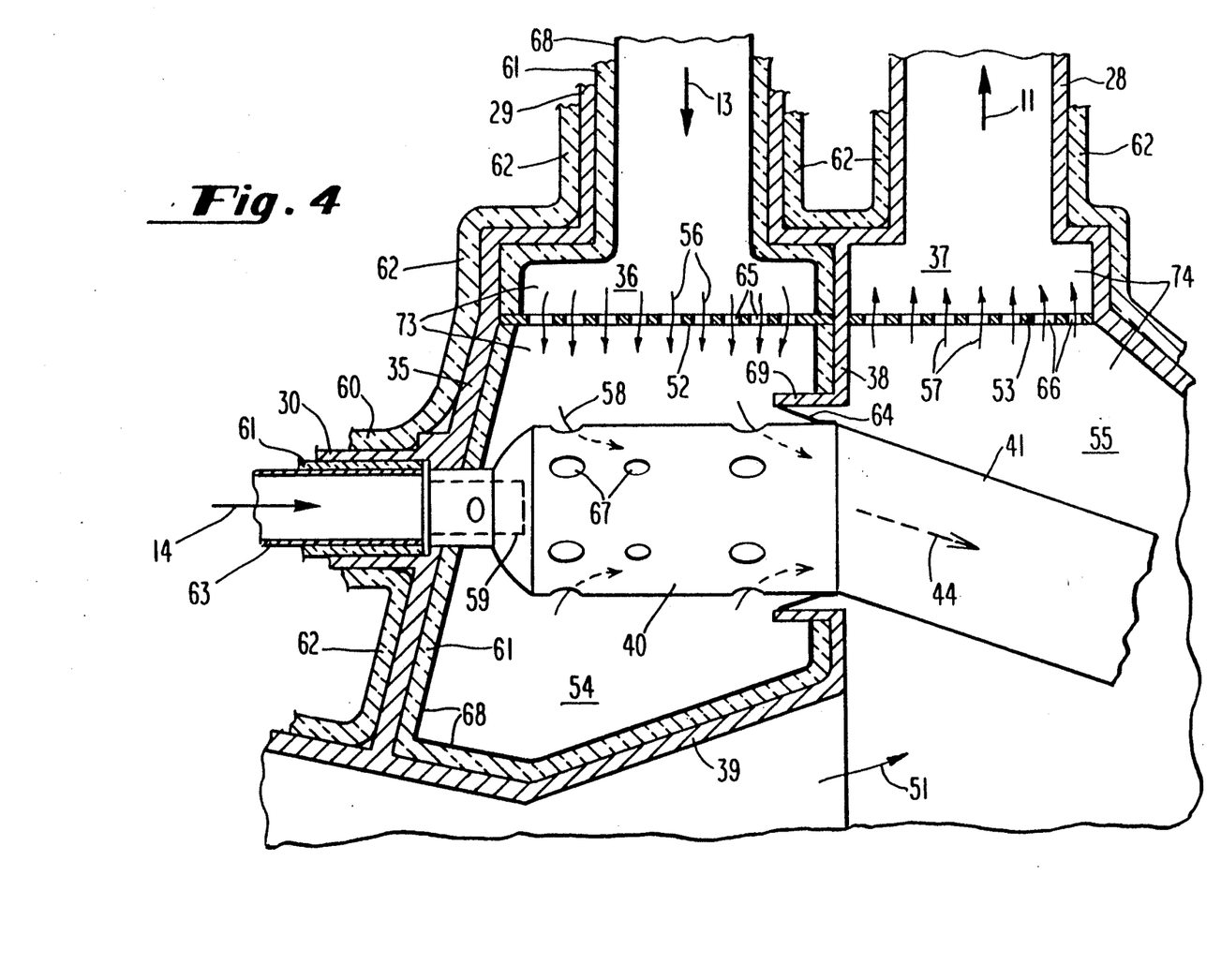
FIG. 4 is an enlarged view of the combustion section of the gas turbine shown in FIG. 2.

As shown in FIGS. 2, 3 and 4, a cylindrical perforated baffle 52 is concentrically disposed in cavity 73 so as to divide the cavity into inner and outer annular plenums 54 and 36, respectively, with the outer plenum 36 surrounding the inner plenum 54. The baffle 52 creates a pressure drop in the hot gas 13 flowing through the cavity and, as shown in FIG. 4, holes 65 in the baffle divide the hot gas 13 into numerous streams 56, thereby serving to evenly distribute the hot gas around plenum 54.

As shown in FIG. 3, a plurality of cylindrical combustors 40—referred to as combustors cans—are circumferentially arranged around the plenum 54. The combustor cans 40 are supplied with gas fuel 14, produced by the carbonizer 5, as previously discussed, via a plurality of pipes 30, one pipe being used for each combustor can. The pipes 30 are connected to the upstream face of the combustion section 35 portion of the casing 70 and, as shown in Figure 4, introduce gas fuel 14 into the combustor cans 40 via fuel nozzles 59. Like the hot gas 13, in the preferred embodiment, the gas fuel 14 from the carbonizer 5 is at a temperature of 870° C. (1600° F.), as previously discussed.

As shown in FIG. 4, the hot gas 58 in plenum 54 enters the combustor cans 40 through a plurality of holes 67 formed therein. A gas fuel flow control system, not shown, regulates the flow of gas fuel 14 to the cans 40 so that the hot gas 44 discharged by the cans has been further heated to appropriate temperature for the turbine 27. In the preferred embodiment, this temperature is approximately 1425° C. (2600° F.).

The aft end of each combustor can 40 penetrates through holes formed by cylindrical members 69 in the wall 38 dividing cavity 55 from cavity 54. Communication between the cavities through these holes is prevented by a plurality of plate-like spring seals 64 affixed to the periphery of the aft end of the cans 40. The hot gas 44 discharging from the cans 40 is directed to the turbine section 27 by a transition duct 41. The transition ducts 41 are attached to the aft end of each can and extend through plenum 55.

As shown in FIG. 2, the turbine section 27 is comprised of a shaft 49, about the outer periphery of which are affixed a plurality of rotating blades 46 arranged in circumferentially extending rows. A plurality of stationary vanes 45, arranged in circumferentially extending rows between each row of rotating blades 46, are affixed to the inner surface of a turbine inner cylinder 43—referred to as the blade ring. The inner cylinder 43 surrounds the tips of the blades 46 and is enclosed by the turbine section 42 of the casing 70. After the hot gas 44 has been expanded in the turbine section 27, and useful work obtained therefrom, the expanded gas 17 is exhausted to the HRSG 6, as previously discussed.

In order to minimize thermal stresses in the turbine stationary vanes 45 and vibratory excitation of the turbine rotating blades 46, it is important that the hot gas 44 exiting from the transition ducts 41 have as uniform a temperature and flow rate distribution as possible in both the radial and circumferential directions. Thus, baffle 52 and plenum 36 serves to evenly distribute the flow of hot gas 13 from the PFBC 3 circumferentially around plenum 54 so that the hot gas is uniformly supplied to each of the combustor cans 40.

Figure 5:
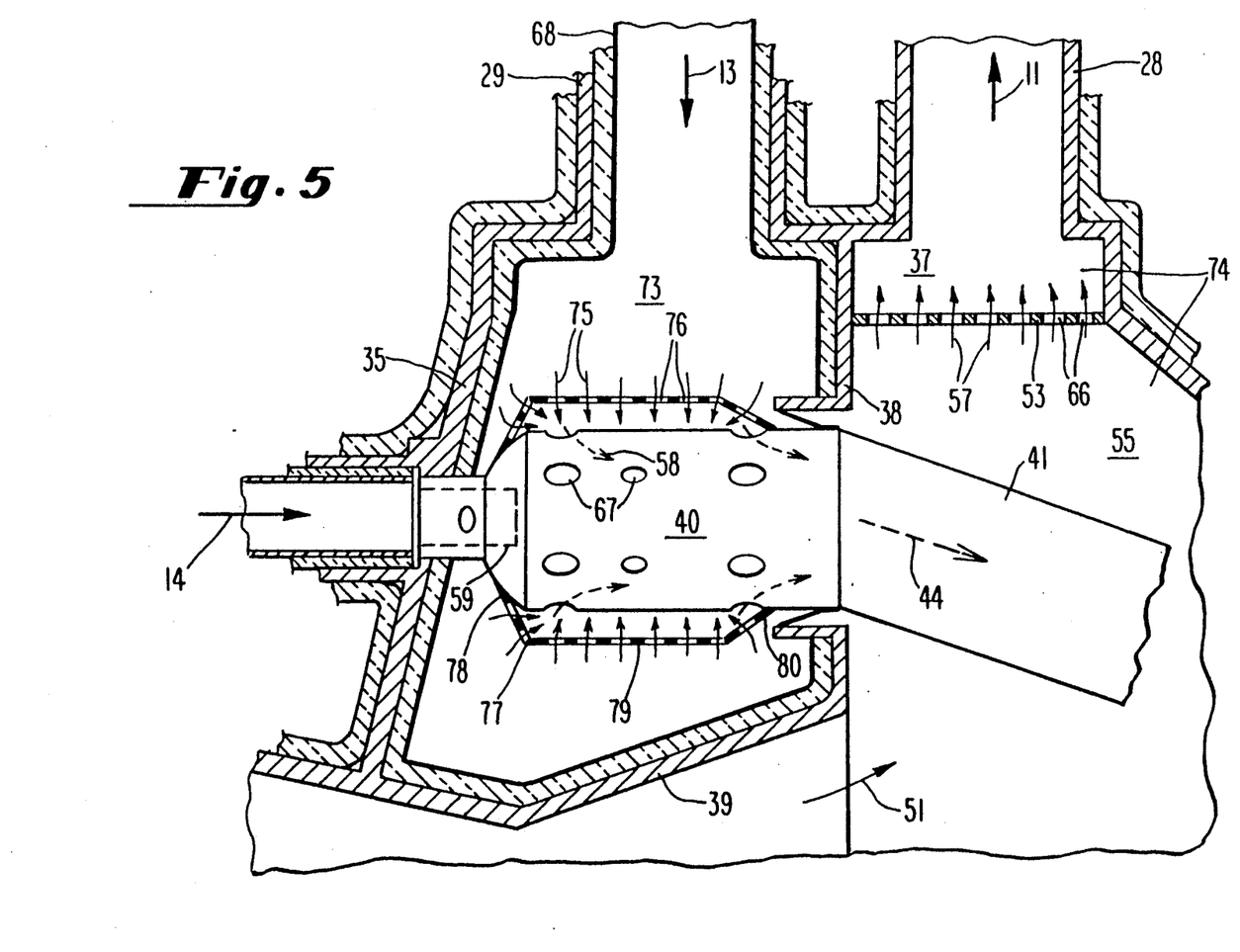
FIG. 5 shows a second embodiment of the invention shown in FIG. 4.

According to a second embodiment of the invention, the hot gas 13 from the PFBC 3 is uniformly distributed to each combustor can 40 by a baffle 77, as shown in FIG. 5. The baffles 77 are mounted on each combustor can 40 and enclose all but the forward portion—that is, the portion through which the fuel nozzle 59 extends—and the aft portion of each combustor can. Each baffle 77 is comprised of a conical front portion 78, a cylindrical center portion 79 and a conical aft portion 80. The baffle portions are formed from perforated plate, so that a plurality of holes 76 are disposed throughout the baffle 77. The baffles 77 divide the hot gas 13 from the PFBC into numerous streams 75 and create a pressure drop in the hot gas. As a result, the hot gas 13 is distributed uniformly to each combustor can 40 even though it initially enters the cavity 73 at only four locations. Note that, if desired, both baffles 77, shown in FIG. 5, and baffle 52, shown in FIG. 4, can be utilized to ensure maximum uniformity in flow distribution.

As shown in FIG. 5, the baffle 77 is perforated throughout by holes 76. However, the holes 76 could be formed in only the front portion 78 of the baffle 77 so that no flow was permitted through portions 79 and 80. This would force the hot gas 13 to turn from flowing radially inward to flowing axially rearward before entering the combustor can 40, thereby further serving to uniformly distribute the flow to each combustor can.

As shown in FIG. 4, a layer of insulation 62 is formed on the external surfaces of the combustion section portion 35 of the casing 70 and on the external surfaces of the pipes 28 and 29 to avoid heat loss and protect personnel. In addition, according to the current invention, in order to minimize thermal stresses in the pipes 29 connecting the cavity 73 to the PFBC 3, a layer of insulation 61 is formed around the inner surface of pipes 29 and cavity 73, so that the insulation is disposed between the hot gas 13 flowing through the cavity and the portion of the combustion section casing 35 forming cavity 73, as well as between the hot gas and the compressor diffuser 39 and the hot gas and the wall 38. The insulation maybe formed from ceramic fibers on other suitable high temperature materials. In order to protect the insulation from erosion by the hot gas 13, a layer of sheet metal 68, formed from a temperature resistant alloy, such as Inconel, is disposed between the insulation 61 and the hot gas 13.

As can be seen, according to the arrangement taught by the current invention, the very hot gas from the topping combustor need be ducted only a short distance from the aft end of each combustor can 40 t the inlet of the turbine section 27. Moreover, since the ducts 41 are disposed in plenum 55 and the compressed air 55 flowing through plenum 55 is at a pressure only slightly higher than that of the hot gas 44 flowing through the ducts (as a result of the pressure drop through the PFBC 3, cyclone separator 4 and interconnecting piping), the ducts can be formed from relatively thin metal, thereby minimizing the terminal stress in the ducts. Moreover, slight cracks in the ducts 41 are not especially harmful since they would only result in compressed air 51 bleeding into the hot gas 44. This is in contrast to the external duct which would be required to transport the very hot gas from an external toping combustor to the turbine, as taught by the prior art, wherein the duct would have to be formed from thick metal to withstand the large pressure differential between the hot gas the ambient environment, thereby exacerbating thermal stress, and wherein cracks in the duct would result in the leakage of the very hot as into the ambient environment.

Although only a preferred embodiment of the invention has been discussed, many variations and modifications of the invention may be practiced without departing from the spirit and scope of the invention as set forth in the following claims.

I claim:

1. A gas turbine system for generating rotating shaft power comprising:
   (a) a casing enclosing a compressor for compressing air and enclosing a turbine for expanding a hot working gas, first and second cavities formed within said casing between said compressor and said turbine, said compressor in air flow communication with said second cavity, whereby said compressed air from said compressor flows into said second cavity, a combustor disposed in said first cavity;
   (b) a pressurized fluidized bed combustor (PFBC) adapted to receive said compressed air from said compressor and to heat said compressed air so as to produce said hot working as to be expanded in said turbine by burning a solid fuel;
   (c) means for directing said compressed air from said second cavity to said PFBC for heating therein;
   (d) means for directing said hot working gas from said PFBC to said first cavity, said combustor in hot working gas flow communication with said first cavity, whereby said hot working gas from said PFBC flows through said combustor for further heating therein; and
   (e) means enclosed by said casing for preventing gas flow communication between said first and second cavities within said casing.

2. The system according to claim 1 further comprising a first baffle forming first and second plenums in said first cavity, said combustor disposed in said second plenum, said PFBC in hot working gas flow communication with said first plenum, wherein said hot working gas produced by said PFBC flows through said first plenum.

3. The system according to claim 2 wherein said second plenum is in hot working gas flow communication with said first plenum, whereby said hot working gas produced by said PFBC flows through said first plenum into said second plenum.

4. The system according to claim 3 wherein said first plenum is an annular cavity surrounding said second plenum.

5. The system according to claim 4 wherein said first baffle has means for uniformly distributing said hot working gas flowing through said first plenum circumferentially around said second plenum.

6. The system according to claim 5 wherein said combustor comprises a plurality of combustor cans circumferentially distributed around said second plenum.

7. The system according to claim 1 further comprising means for directing hot working gas from said combustor to said turbine, said directing means disposed in said second cavity.

8. The system according to claim 7, further comprising a first baffle forming fist and second plenums in said second cavity, said PFBC in air flow communication with said first plenum, whereby said compressed air received by said PFBC flows through said first plenum.

9. The system according to claim 8 wherein said second plenum is in air flow communication with said compressor, whereby said compressed air from said compressor flows through said second plenum into said first plenum.

10. The system according to claim 9 wherein said first plenum is an annular cavity surrounding said second plenum.

11. The system according to claim 10 wherein said first baffle has means for uniformly distributing said compressed air flowing through said second plenum circumferentially around said first plenum.

12. The system according to claim 1 further comprising a carbonizer adapted to convert coal into said solid fuel burned in said PFBC and a gas fuel, said carbonizer in solid fuel flow communication with said PFBC and in gas fuel flow communication with said combustor.

13. A gas turbine power plant comprising:
   (a) a pressurized fluidized bed combustor (PFBC) for producing a hot working gas by fluidizing a solid fuel in compressed air and burning said fluidized solid fuel; and
   (b) a gas turbine having:
      (i) a compressor adapted to produce said compressed air for fluidizing said solid fuel;
      (ii) a plurality of combustors adapted to further heat said hot working gas produced by said PFBC by burning a gas fuel;
      (iii) a turbine adapted to expand said hot working gas further heated by said combustors;
      (iv) a casing enclosing said compressor, said turbine and said combustors, said casing forming first and second annular cavities, a circumferentially extending barrier separating said first cavity from said second cavity and preventing flow communication therebetween, said combustors disposed in and inflow communication with said first cavity, said second cavity adapted to receive said compressed air from said compressor;
      (v) means for directing said hot working gas further heated by said combustors through said second cavity to said turbine;
      (vi) means for directing said hot working gas from said PFBC to said first cavity; and
      (vii) means for distributing said hot working gas directed to said first cavity circumferentially therearound to each of said combustors.

14. The gas turbine power plant according to claim 13 wherein:
   (a) said compressor and said turbine are connected by a centrally disposed shaft; and (b) said combustors are comprised of cans arranged around said shaft.

15. The gas turbine according to claim 14 wherein said hot gas distributing means comprises a baffle enclosing at least a portion of each of said combustors.

16. The gas turbine according to claim 15 wherein a plurality of holes are formed in at least a portion of each of said baffles.

17. The gas turbine according to claim 13 wherein said hot working gas distributing means comprises an annular plenum formed between said casing and a baffle having a plurality of holes formed therein, said annular plenum surrounding the periphery of said first cavity.

18. The gas turbine according to claim 13 further comprising a layer of insulation formed around the interior of said first cavity.

19. The gas turbine according to claim 18 wherein said casing further comprises a pipe for receiving said hot working gas produced by said PFBC, a layer of insulation formed around the interior of said pipe.

20. The gas turbine according to claim 18 further comprising a layer of sheet metal disposed between said insulation and said interior of said first cavity.

* * * * *